United States Patent
Fang et al.

(10) Patent No.: US 10,269,127 B2
(45) Date of Patent: Apr. 23, 2019

(54) OBJECT DETECTING METHOD AND OBJECT DETECTING DEVICE

(71) Applicant: Nissan Motor Co., Ltd., Yokohama-shi, Kanagawa (JP)

(72) Inventors: Fang Fang, Kanagawa (JP); Hirotoshi Ueda, Kanagawa (JP); Takuya Nanri, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/747,272

(22) PCT Filed: Jul. 27, 2015

(86) PCT No.: PCT/JP2015/071269
§ 371 (c)(1),
(2) Date: Jan. 24, 2018

(87) PCT Pub. No.: WO2017/017766
PCT Pub. Date: Feb. 2, 2017

(65) Prior Publication Data
US 2018/0350083 A1    Dec. 6, 2018

(51) Int. Cl.
*G06T 7/292* (2017.01)
*G01S 17/02* (2006.01)
(Continued)

(52) U.S. Cl.
CPC ............ *G06T 7/292* (2017.01); *G01S 7/4808* (2013.01); *G01S 17/023* (2013.01); *G01S 17/66* (2013.01); *G01S 17/936* (2013.01);
*G06K 9/00805* (2013.01); *G06K 9/6292* (2013.01); *G06T 7/74* (2017.01)

(58) Field of Classification Search
USPC .......................................... 382/103, 104, 106
See application file for complete search history.

(56) References Cited

U.S. PATENT DOCUMENTS 6,727,844 B1 * 4/2004 Zimmermann ....... B60R 21/013
                                                                342/118
8,175,331 B2 * 5/2012 Nagaoka ............... B60W 40/04
                                                                382/103
(Continued)

FOREIGN PATENT DOCUMENTS

| JP | 2004347471 A | 12/2004 |
| JP | 2006292621 A | 10/2006 |
| JP | 2015041265 A | 3/2015 |

*Primary Examiner* — Ishrat I Sherali
(74) *Attorney, Agent, or Firm* — Young Basile Hanlon & MacFarlane, P.C.

(57) ABSTRACT

Multiple objects detected by multiple sensors are subjected to a determination as to whether or not the objects are identical to each other. If there is an object in the multiple objects, of which object position becomes undetectable after the point when the multiple objects detected by the multiple sensors are determined to be the identical object, a determination is made as to whether or not the continuously detected object is an object identical to the object in a previous processing based on a predicted range calculated from a previously detected object position of the object becoming undetectable, and on a range of presence estimated from an object position of the continuously detected object.

5 Claims, 11 Drawing Sheets

(51) Int. Cl.
*G01S 17/66* (2006.01)
*G01S 17/93* (2006.01)
*G01S 7/48* (2006.01)
*G06T 7/73* (2017.01)
*G06K 9/00* (2006.01)
*G06K 9/62* (2006.01)

(56) References Cited

U.S. PATENT DOCUMENTS

| | | | |
|---|---|---|---|
| 2005/0152580 A1* | 7/2005 | Furukawa | G06K 9/3241 |
| | | | 382/103 |
| 2007/0165910 A1* | 7/2007 | Nagaoka | B60W 40/04 |
| | | | 382/104 |
| 2015/0054673 A1 | 2/2015 | Baba | |
| 2017/0098298 A1* | 4/2017 | Nishijima | G06T 7/004 |

\* cited by examiner

TIME T-1       TIME T

TIME T−1

TIME T

TIME T−1

TIME T

TIME T-1          TIME T

TIME T-1          TIME T

FIG. 12
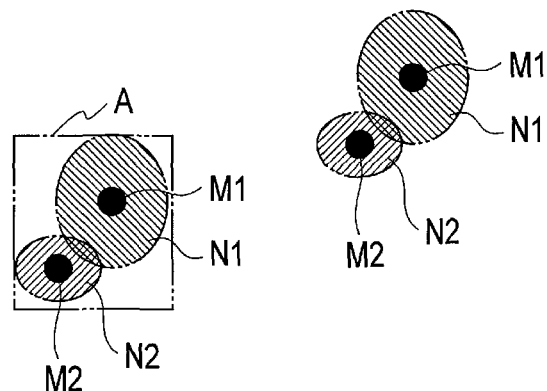
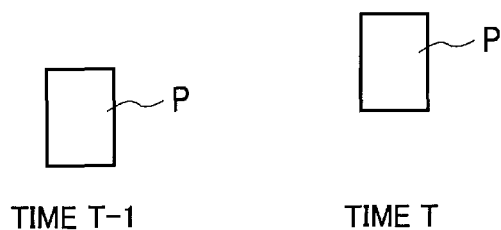
TIME T-1    TIME T
FIG. 13A         FIG. 13B
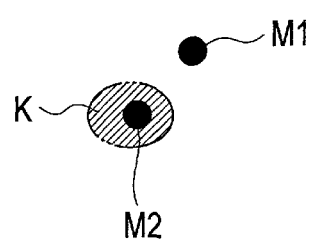    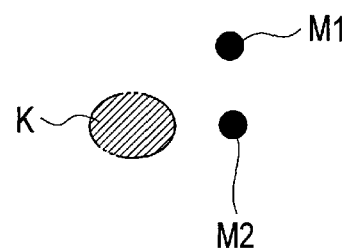

FIG. 14
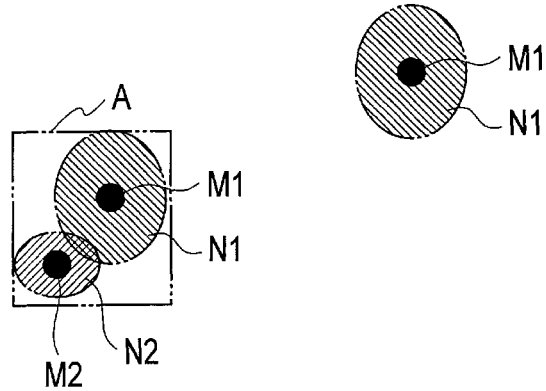
TIME T-1        TIME T
FIG. 15A              FIG. 15B
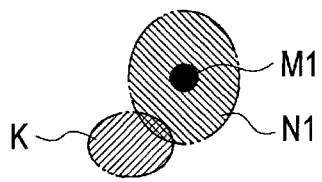     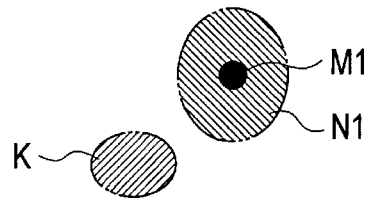

TIME T-1

TIME T

OBJECT DETECTING METHOD AND OBJECT DETECTING DEVICE

TECHNICAL FIELD

The present invention relates to an object detecting method and an object detecting device, which are configured to detect an object around a vehicle.

BACKGROUND

There has been proposed a technique applicable to a device configured to detect a position of a leading vehicle located ahead of an original vehicle by using multiple sensors, which is configured to determine detection results of object positions by the respective sensors as an identical leading vehicle when the detection results of the object positions are substantially equal to one another in terms of horizontal and front-back directions (see Japanese Patent Application Publication No. 2004-347471). In the case where the detection results by the respective sensors are substantially equal to one another in terms of the horizontal direction but are not substantially equal to one another in terms of the front-back direction, the above-described device determines the object continuously as the identical leading vehicle when velocities of the object detected by the respective sensors are substantially equal to one another, and when detection results on the object by the respective sensors reached the determination that the object was the identical leading vehicle in a previous processing.

However, if another vehicle approaches the leading vehicle detected by the multiple sensors, for example, the other approaching vehicle may be erroneously identified as the object identical to the leading vehicle detected earlier. In this way, the technique described in Patent Literature 1 may not be able to continuously and correctly identify whether or not the object is identical from the detection results on the multiple objects by the multiple sensors.

SUMMARY

In view of the above-mentioned problem, it is an object of the present invention to provide an object detecting method and an object detecting device, which are capable of identifying a surrounding object at high accuracy from object detection results by multiple sensors.

When multiple objects detected by multiple sensors are determined to be an identical object and then an object position of one object out of the multiple objects becomes undetectable later, an object detecting device determines whether or not the continuously detected object is an object identical to the object in a previous processing based on a predicted range calculated from a previously detected object position of the object becoming undetectable, and on a range of presence estimated from an object position of the continuously detected object.

According to the present invention, it is possible to provide the object detecting method and the object detecting device, which are capable of identifying a surrounding object at high accuracy from the object detection results by the multiple sensors by predicting the range of presence of the object from the object position detected in the past.

BRIEF DESCRIPTION OF THE DRAWINGS

FIG. 12 is a diagram for explaining a method of determining identity between the object detected in the previous processing and the object detected in the current processing in the case where the object position detecting sensors are not switched;

FIGS. 13(a) and 13(b) are diagrams for explaining the method of determining identity between the object detected in the previous processing and the object detected in the current processing in the case where the object position detecting sensors are not switched;

FIG. 14 is a diagram for explaining a method of determining identity between the object detected in the previous processing and the object detected in the current processing in the case where the object position detecting sensors are switched;

FIGS. 15(a) and 15(b) are diagrams for explaining the method of determining identity between the object detected in the previous processing and the object detected in the current processing in the case where the object position detecting sensors are switched;

DETAILED DESCRIPTION OF THE EMBODIMENTS

Embodiments of the present invention will be described with reference to the drawings. In the description of the

First Embodiment

Figure 1:
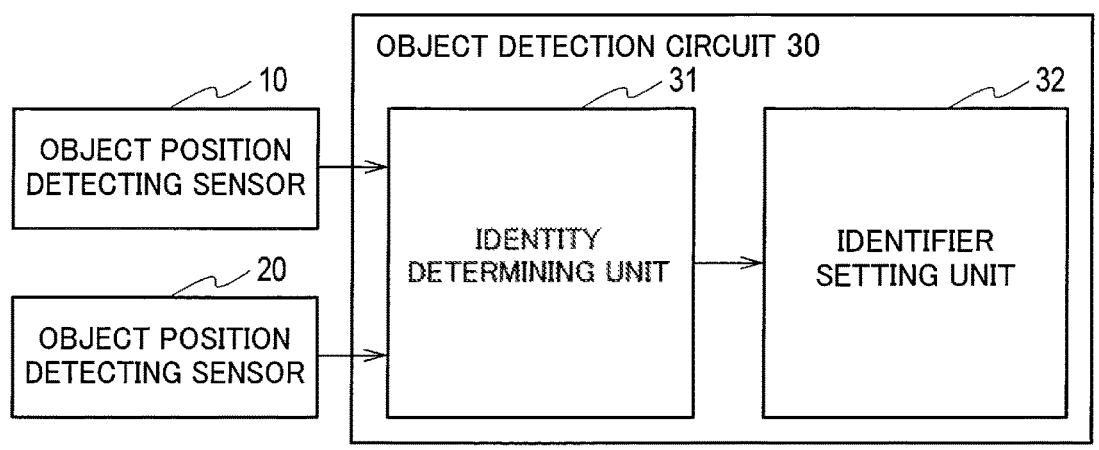
FIG. 1 is a schematic block diagram for explaining a basic configuration of an object detecting device according to a first embodiment.

FIG. 1 is a diagram for explaining a configuration of an object detecting device according to a first embodiment of the present invention. The object detecting device according to the first embodiment includes multiple object position detecting sensors 10 and 20, and an object detection circuit 30. The object detecting device according to the first embodiment is mounted on a moving body such as a vehicle P (see FIG. 2), and detects objects located around the vehicle P by using the multiple object position detecting sensors 10 and 20.

Figure 2:
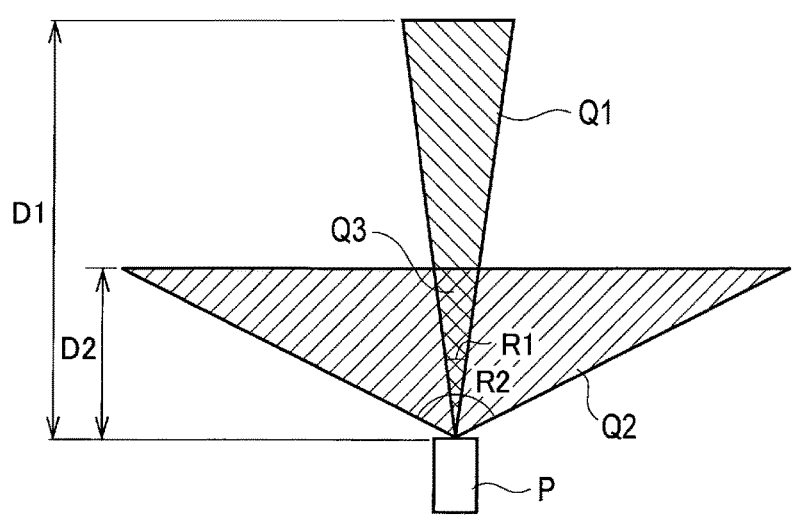
FIG. 2 is a diagram for explaining detecting regions detectable by two object position detecting sensors, respectively.

FIG. 2 is a diagram for explaining detecting regions Q1 and Q2 which are detectable by the multiple object position detecting sensors 10 and 20, respectively. The object position detecting sensor 10 detects an object position relative to the vehicle P, of an object that is present in the detecting region Q1 around the vehicle P. The object position detecting sensor 20 detects an object position relative to the vehicle P, of an object that is present in the detecting region Q2 around the vehicle P, which at least partially overlaps the detecting region Q1.

The object position detecting sensor 10 includes a camera as a sensor, which shoots a digital image by using a solid-state image sensing device such as a CCD and a CMOS. The object position detecting sensor 10 detects the object position and a velocity of the object in the detecting region Q1 relative to the vehicle P by subjecting the shot images sequentially to image processing, and outputs detection results to an object detection circuit 30. The detecting region Q1 is a region within a predetermined viewing angle R1 and a detectable distance D1 in front of the vehicle P, for example. The detectable distance D1 is about 200 m, for instance.

The object position detecting sensor 20 includes a laser range finder (LRF) as a sensor, which detects a position of a target by using reflection of irradiated light, for example. The object position detecting sensor 20 detects the object position and a velocity of the object in the detecting region Q2 relative to the vehicle P by sequentially performing optical scanning, and outputs detection results to the object detection circuit 30. The detecting region Q2 is a region within a predetermined viewing angle (scanning angle) R2 and a detectable distance D2 in front of the vehicle P, for example. The viewing angle R2 is wider than the viewing angle R1 in such a way as to encompass the viewing angle R1 while the detectable distance D2 is shorter than the detectable distance D1, for example. The detectable distance D2 is about 80 m, for instance. The multiple object position detecting sensors 10 and 20 define an overlapping region Q3, which is a region within the viewing angle R1 and the detectable distance D2 where the detecting regions Q1 and Q2 overlap each other.

The object detection circuit 30 further includes an identity determining unit 31 and an identifier setting unit 32. The object detection unit 30 determines whether or not multiple objects detected by the multiple object position detecting sensors 10 and 20 are identical to each other, then sets an identical identifier to the identical object, and keeps on setting the identical identifier to the object which is continuously detected. One object position is determined based on object position detection results by the object position detecting sensors 10 and 20 regarding each of the identifiers. For example, when the object position detecting sensor 10 includes the camera while the object position detecting sensor 20 includes the LRF as the sensors, respectively, the object position detected by the object position detecting sensor 20, which has higher position detection accuracy than that of the object position detecting sensor 10, may be determined as the object position of the object corresponding to the identifier.

The identity determining unit 31 determines at regular intervals whether or not the multiple objects detected by the object position detecting sensor 10 and the object position detecting sensor 20 are identical to each other. Moreover, the identity determining unit 31 determines whether or not the multiple objects detected earlier by at least one of the object position detecting sensor 10 and the object position detecting sensor 20 are identical to the objects having been subjected to the determination of identity. Specifically, the identity determining unit 31 determines the identity between the multiple objects that are detected by at least one of the object position detecting sensor 10 and the object position detecting sensor 20 from time to time.

The identifier setting unit 32 sets an identical identifier to the objects determined to be identical by the identity determining unit 31, and sets identifiers that are different from each other to the objects determined to be not identical by the identity determining unit 31. In this way, the identifier setting unit 32 sets the identifiers to the detection results detected by at least one of the object position detecting sensor 10 and the object position detecting sensor 20 depending on determination results by the identity determining unit 31. The identifiers only need to be capable of identifying the objects based on the respective detection results, and may be formed of serial numbers, for instance.

The object detection circuit 30 can be formed from a microcontroller, which is an integrated circuit including a central processing unit (CPU), a memory, and an input-output interface, for example. In this case, the identity determining unit 31 and the identifier setting unit 32 are realized by causing the CPU to execute computer programs installed in advance on the microcontroller. The identity determining unit 31 and the identifier setting unit 32 constituting the object detection circuit 30 may be formed from integrated hardware or from separate pieces of hardware. Meanwhile, the microcontroller may also serve as an electronic control unit (ECU), which is used for control related to the vehicle P, for example. The same applies to sections in the multiple object position detecting sensors 10 and 20 which conduct information processing.

Figure 3:
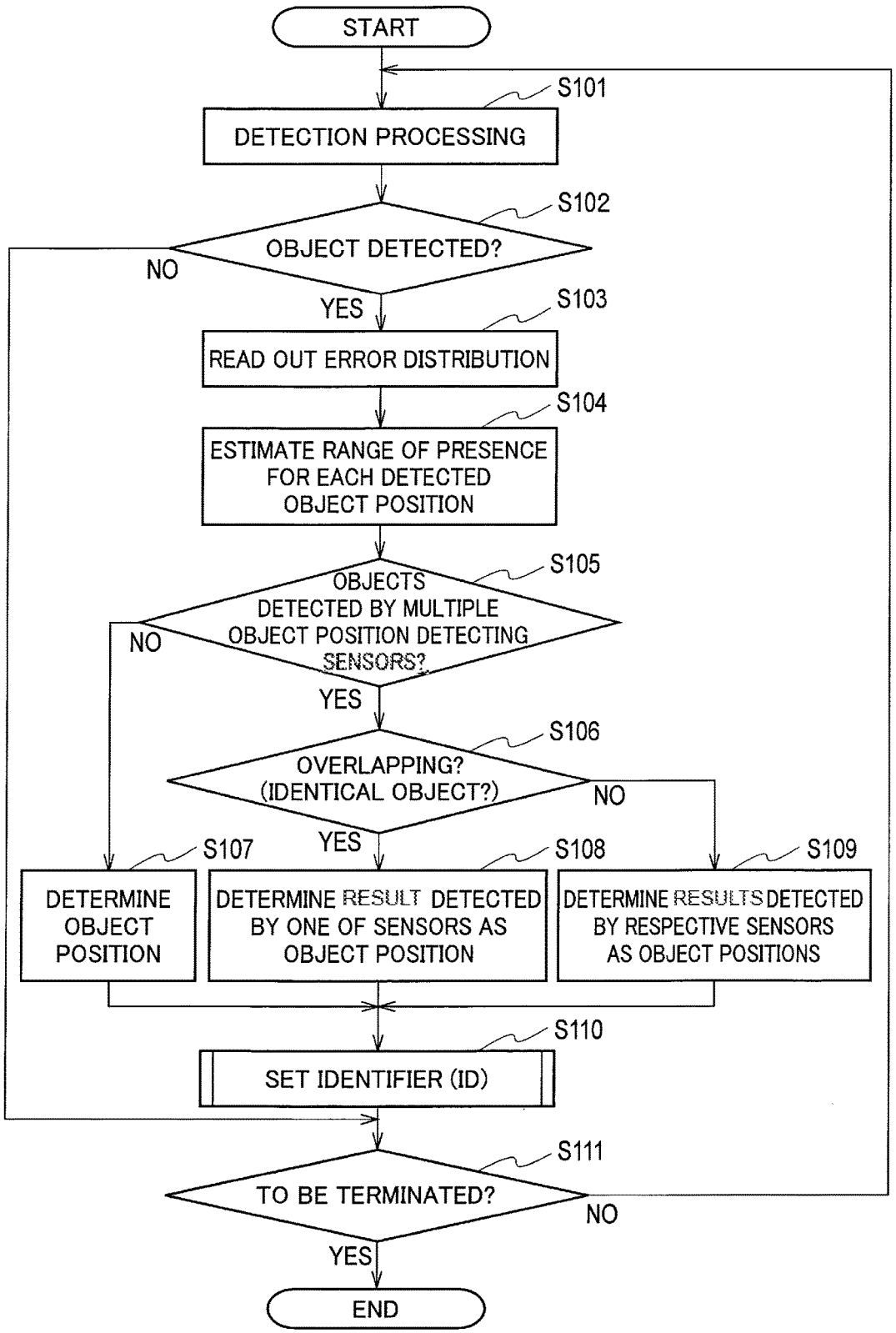
FIG. 3 is a flowchart for explaining an example of an object detecting method executed by the object detecting device according to the first embodiment.

FIG. 3 is a flowchart showing a series of processing to be executed by the object detecting device according to the first embodiment. An example of an object detecting method using the object detecting device according to the first embodiment will be described with reference to the flowchart of FIG. 3.

First, in step S101, each of the multiple object position detecting sensors 10 and 20 detects an object position and a velocity relative to the vehicle P of each object present in the detecting region Q1 or the detecting region Q2. The object positions and the velocities detected by the multiple object position detecting sensors 10 and 20, respectively, are outputted as the detection results to the identity determining unit 31 of the object detection circuit 30.

In step S102, based on the respective detection results by the object position detecting sensors 10 and 20, the identity determining unit 31 determines whether or not at least one of the object position detecting sensors 10 and 20 detects an object. The processing proceeds to step S103 when an object is detected, or the processing proceeds to step S111 when no object is detected.

The identity determining unit 31 reads error distribution, which corresponds to an object position detected by any one of the object position detecting sensors 10 and 20 in step S101, out of a memory in step S103. For example, the identity determining unit 31 includes the memory that stores the error distribution of the detection results (the object positions) corresponding to distances to the objects, which are preset for each of the multiple object position detecting sensors 10 and 20 in advance.

In step S104, the identity determining unit 31 estimates a range of presence as a range in which each object is possibly present, based on the object position detected by at least one of the multiple object position detecting sensors 10 and 20, and on the error distribution read out in step S103. The range of presence is estimated by setting the region around the detected object position so as to correspond to the error distribution, for example. The error distribution can be set to the object position as with FIG. 7 to be described later.

In step S105, the identity determining unit 31 determines whether or not the object is detected by both of the multiple object position detecting sensors 10 and 20. The processing proceeds to step S106 when the object is detected by both, or the processing proceeds to step S107 when the object is not detected by both, that is, when only one of the multiple object position detecting sensors 10 and 20 detects the object.

In step S106, the identity determining unit 31 determines whether or not the range of presence estimated from the object position detected by the object position detecting sensor 10 overlaps the range of presence estimated from the object position detected by the object position detecting sensor 20. In this way, the identity determining unit 31 determines whether or not the object detected by the object position detecting sensor 10 is identical to the object detected by the object position detecting sensor 20 based on the two ranges of presence. When the ranges of presence overlap each other, the objects are deemed to be identical and the processing proceeds to step S108. When the ranges of presence do not overlap each other, the multiple objects are deemed to be not identical and the processing proceeds to step S109.

Figure 4:
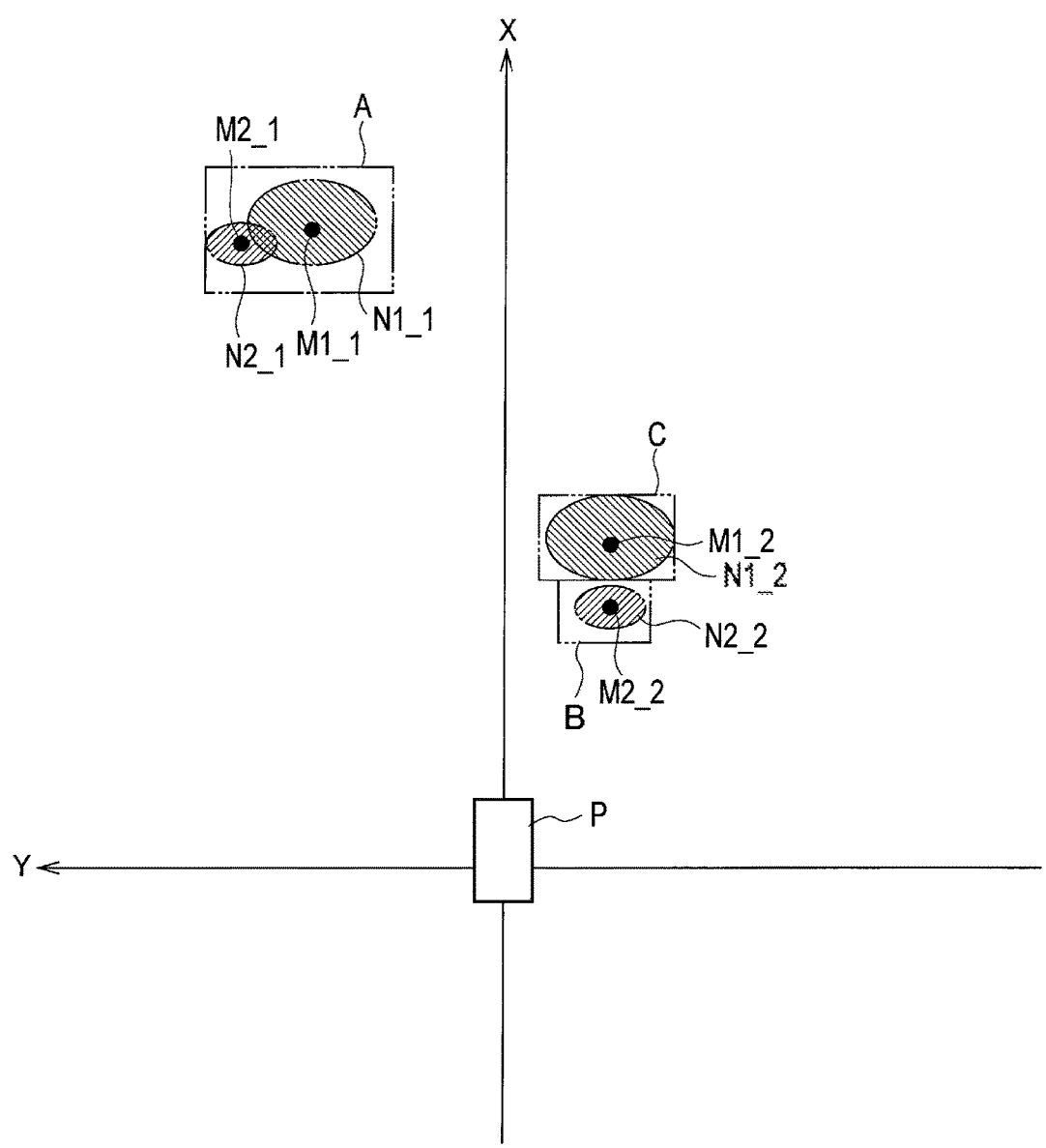
FIG. 4 is a diagram for explaining a method of determining identity between objects detected by the two object position detecting sensors, respectively.

FIG. 4 is an illustrated example of the detection results by the object position detecting sensor 10 and the object position detecting sensor 20 in order to explain a method of determining identity between the multiple objects in step S106. For instance, object positions M1_1 and M1_2 of two objects are detected by the object position detecting sensor 10, and object positions M2_1 and M2_2 of two objects are detected by the object position detecting sensor 20, respectively. Moreover, ranges of presence N1_1, N1_2, N2_1, and N2_2 are estimated by the identity determining unit 31, respectively, for the four object positions M1_1, M1_2, M2_1, and M2_2 detected by the object position detecting sensors 10 and 20. In this case, the identity determining unit 31 determines the objects which correspond to the ranges of presence N1_1 and N2_1 overlapping each other as an identical object A. In the meantime, the identity determining unit 31 determines the objects which correspond to the ranges of presence N1_2 and N2_2 not overlapping each other as different objects B and C which are not identical to each other.

In step S107, the identity determining unit 31 determines the detection results detected in step S101 as the object positions and velocities of the objects.

In step S108, the identity determining unit 31 determines the detection results, which are detected by one of the multiple object position detecting sensors 10 and 20 in step S101, as the object position and the velocity of the object determined to be identical. For example, regarding the object A shown in FIG. 4 and assuming the case in which the object position detecting sensor 10 includes the camera and the object position detecting sensor 20 includes the LRF as the sensors, respectively, the identity determining unit 31 may determine the object position M2_1 detected by the object position detecting sensor 20 that has the higher position detection accuracy than that of the object position detecting sensor 10 as the object position of the object A.

In step S109, the identity determining unit 31 determines the detection results, which are detected by the multiple object position detecting sensors 10 and 20 in step S101, respectively, as the object positions and the velocities of the objects determined to be not identical. For example, regarding the objects B and C shown in FIG. 4, the identity determining unit 31 determines the object position M1_2 detected by the object position detecting sensor 10 as the object position of the object C, and determines the object position M2_2 detected by the object position detecting sensor 20 as the object position of the object B.

In step S110, the identity determining unit 31 and the identifier setting unit 32 perform processing for setting an identifier to each object of which position is determined in steps S107 to S109. Then, a determination is made in step S111 as to whether or not the processing is to be terminated. Usually, it is determined that the processing is not to be terminated. Hence, the processing goes back to step S101 and the series of the processing S101 to S110 is repeated. As described above, the series of processing shown in the flowchart of FIG. 3 is repeated at regular intervals. The processing is terminated upon a determination that the processing is to be terminated as a consequence of tuning an ignition switch off, for example.

Figure 5:
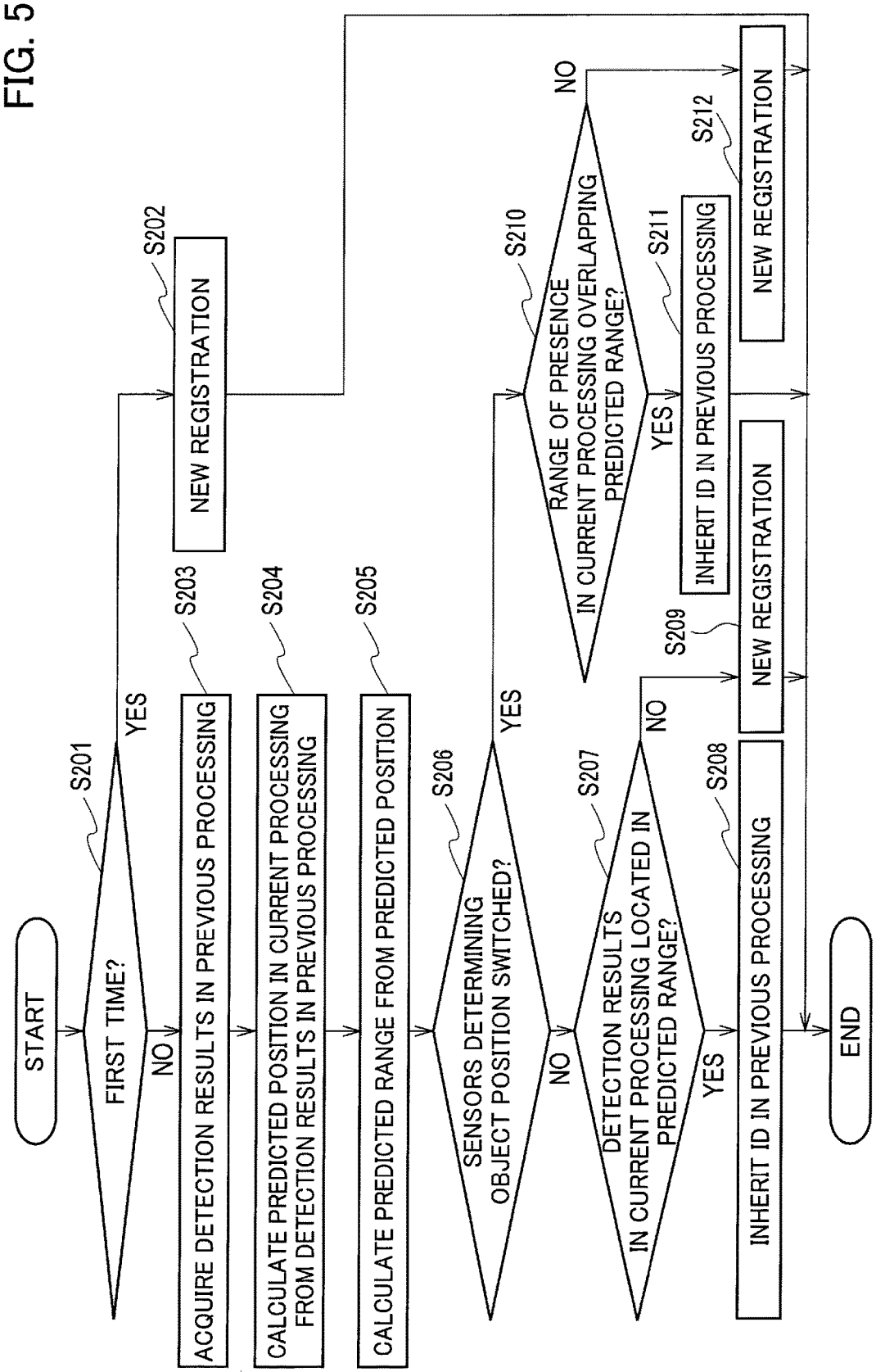
FIG. 5 is a flowchart for explaining detailed processing in step S110 of FIG. 3 to be executed by the object detecting device according to the first embodiment.

FIG. 5 is a flowchart for explaining detailed processing in step S110 of FIG. 3. First, in step S201, the identity determining unit 31 determines whether or not identification processing in step S110 is being performed for the first time on the object of which detection result (position) is determined in steps S107 to S109. When the processing is being performed for the first time, the identifier setting unit 32 newly sets an identifier to the object of which result is determined in steps S107 to S109, and registers the set identifier in step S202. The processing proceeds to step S203 if the processing is not being performed for the first time.

In step S203, the identity determining unit 31 acquires the detection results outputted in step S101 of a previous processing. For example, the identity determining unit 31 stores the detection results, which are outputted in every processing of step S101, sequentially and cyclically in the memory incorporated therein, and acquires the detection results by reading the detection results in the previous processing out of the memory.

In step S204, the identity determining unit 31 calculates a predicted position as a position where the object is possibly present in a current processing by using the detection results in the previous processing acquired in step S203. In step S205, the identity determining unit 31 calculates a predicted range as a range in which the object is possibly present in the current processing by using the predicted position calculated in step S204.

Figure 6:
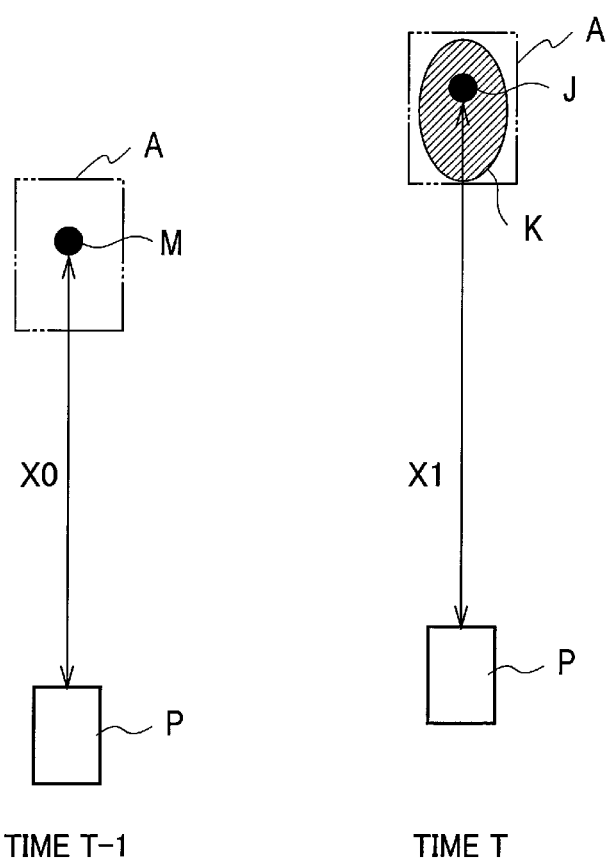
FIG. 6 is a diagram for explaining a method of calculating a predicted position and a predicted range in a current processing from a position and a velocity of an object detected in a previous processing.

FIG. 6 is a diagram for explaining a method of calculating a predicted position J and a predicted range K at time T in the current processing from an object position M and a velocity V of the object A relative to the vehicle P, which were detected at time T−1 in the previous processing. For example, at the time T−1, a component of the object position M in a front-back direction (an x-axis direction) of the vehicle P is set to X0=40 m and a component thereof in a right-left direction (a y-axis direction) is set to Y0=0 m. At the same time, a component of the velocity V in the x-axis direction is set to VX=20 km/h and a component thereof in the y-axis direction is set to VY=0 km/h. When the object position M and the velocity V mentioned above are acquired at the current time T after a lapse of a cycle Δt=0.1 s, the relative predicted position J is calculated as X1=X0+VX× Δt≈40.6 m in terms of the x-axis direction component and Y1=0 m in terms of the y-axis direction component.

Figure 7:
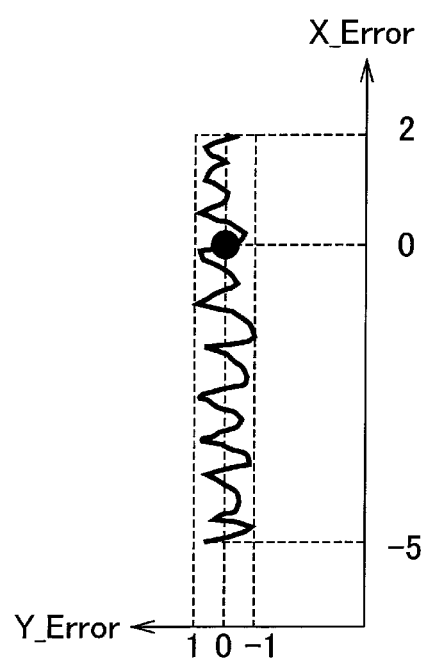
FIG. 7 is an illustrated example of error distribution of detection results by the object position detecting sensors.

FIG. 7 is an illustrated example of the error distribution corresponding to the case of detecting the object at the object position M (X1, Y1) relative to the vehicle P. In FIG. 7, the origin (0, 0) means a true value which represents an actual relative object position. FIG. 7 shows the distribution in which the error in the front-back direction (the x direction) is large relative to the vehicle P while the error in the right-left direction (the y direction) is small. The identity determining unit 31 reads the error distribution of FIG. 7 corresponding to the calculated predicted position J (X1, Y1), and then calculates the predicted range K by setting a region such that the predicted position J corresponds to the true value and the predicted range K corresponds to the range of the error distribution.

In step S206, the identity determining unit 31 determines whether or not the object position detecting sensors 10 and 20 which detect the object position determined in steps S107 to S109 of the current processing are switched from the multiple object position detecting sensors 10 and 20 which detected the object position determined in steps S107 to S109 of the previous processing. The processing proceeds to step S207 when the sensors are not switched, or the processing proceeds to step S210 when the sensors are switched.

Figure 8:
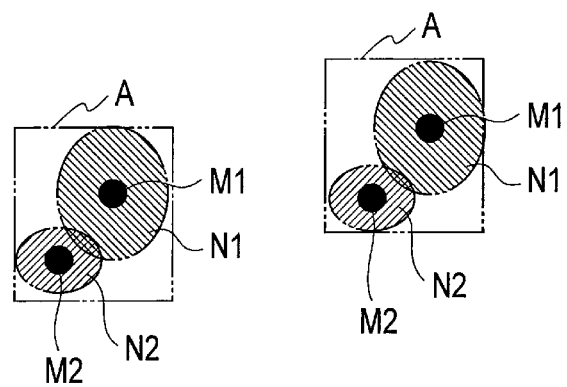
FIG. 8 is a diagram for explaining a case in which the object position detecting sensors to detect detection results to be determined as a position of the object are not switched.
Figure 8:
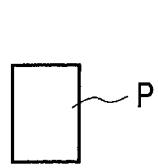
Figure 8:
Figure 9:
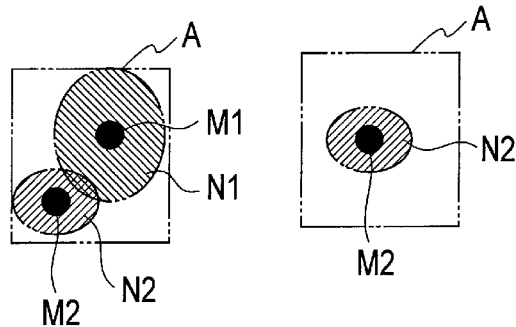
FIG. 9 is a diagram for explaining the case in which the object position detecting sensors to detect the detection results to be determined as the position of the object are not switched.
Figure 9:
Figure 9:

FIG. 8 and FIG. 9 are diagrams for explaining the case in which the multiple object position detecting sensors 10 and 20 that detect the determined object position of the object A are not switched. As shown in FIG. 8, the multiple object positions M1 and M2 of the object A are assumed to have been detected by the multiple object position detecting sensors 10 and 20 at the time T−1 in the previous processing, and the object position M2 detected by the object position detecting sensor 20 having the higher detection accuracy is assumed to have been determined as the object position of the object A in step S108 of the previous processing. Thereafter, if the multiple object positions M1 and M2 of the object A are detected by the multiple object position detecting sensors 10 and 20 again at the time T in the current processing, then the object position detecting sensor that detects the determined object position of the object A is not switched from the object position detecting sensor 20.

On the other hand, as shown in FIG. 9, the multiple object positions M1 and M2 of the object A are assumed to have been detected by the multiple object position detecting sensors 10 and 20 at the time T−1 in the previous processing, and the object position M2 detected by the object position detecting sensor 20 is assumed to have been determined as the object position of the object A likewise. Thereafter, if the object position M1 of the object A is not detected by the object position detecting sensor 10 at the time T in the current processing, then the object position detecting sensor that detects the determined object position of the object A is not switched from the object position detecting sensor 20 likewise.

Figure 10:
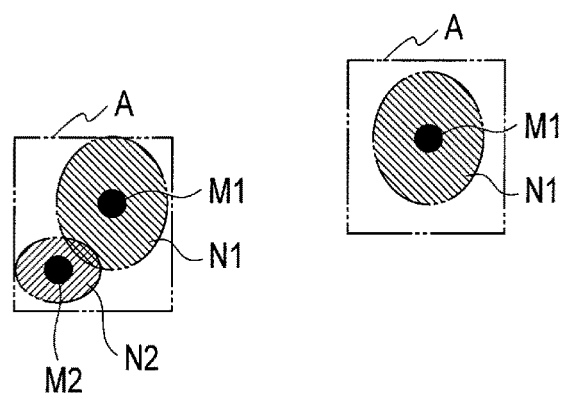
FIG. 10 is a diagram for explaining a case in which the object position detecting sensors to detect the detection results to be determined as the position of the object are switched.
Figure 11:
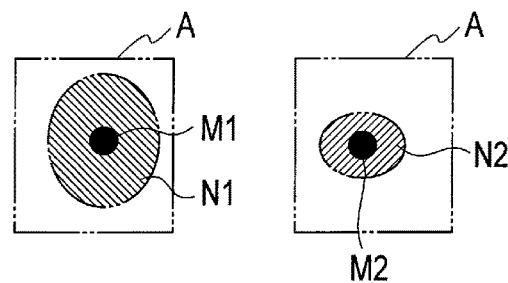
FIG. 11 is a diagram for explaining the case in which the object position detecting sensors to detect the detection results to be determined as the position of the object are switched.

FIG. 10 and FIG. 11 are diagrams for explaining the case in which the object position detecting sensors 10 and 20 that detect the determined object position of the object A are switched. As shown in FIG. 10, the multiple object positions M1 and M2 of the object A are assumed to have been detected by the two object position detecting sensors 10 and 20 at the time T−1 in the previous processing, and the object position M2 detected by the object position detecting sensor 20 having the higher detection accuracy is assumed to have been determined as the object position of the object A in step S108 of the previous processing. Thereafter, if the object position M2 is not detected by the object position detecting sensor 20 at the time T in the current processing, then only the object position M1 is detected by the object position detecting sensor 10. Hence, the object position M1 is determined as the object position of the object A in step S107. Accordingly, the object position detecting sensor that detects the determined object position of the object A is switched from the object position detecting sensor 20 to the object position detecting sensor 10.

On the other hand, as shown in FIG. 11, only the object position M1 of the object A is assumed to have been detected by the object position detecting sensor 10 at the time T−1 in the previous processing, and the object position M1 is assumed to have been determined as the object position of the object A in step S107 of the previous processing. Thereafter, if the object position M1 is not detected by the object position detecting sensor 10 and the object position M2 is detected by the object position detecting sensor 20 at the time T in the current processing, then the object position M2 is determined as the object position of the object A in step S107. Accordingly, the object position detecting sensor that detects the determined object position of the object A is switched from the object position detecting sensor 10 to the object position detecting sensor 20.

In step S207, the identity determining unit 31 determines whether or not the object position determined in steps S107 to S109 of the current processing is located in the predicted range calculated in step S205. In other words, the identity determining unit 31 determines whether or not the object detected in the current processing is identical to the object detected in the previous processing based on the object position detected in the current processing and on the predicted range in the current processing calculated from the object position detected in the previous processing. The processing proceeds to step S208 when the object position detected in the current processing is located therein, or the processing proceeds to step S209 when the object position is not located therein.

FIG. 12 is a diagram for explaining the case in which the object position detecting sensors 10 and 20 that detect the detection results to be determined as the object position are not switched from the previous processing. At the processing time T−1 in the previous processing and the processing time T in the current processing, the object positions M1 and M2 are detected by the two object position detecting sensors 10 and 20, and the object position M2 is determined as the object position of the object A. A description will be given of a method of causing the identity determining unit 31 in this case to determine in step S207 whether or not the object detected in the current processing is identical to the object detected in the previous processing.

FIG. 13(a) is a diagram for explaining a case in which the object position M2 was determined as the object position of the object A in the previous processing, and the object position M2 detected in the current processing is located in the predicted range K in the current processing, which is calculated from the object position M2 detected in the previous processing. In this case, the identity determining unit 31 determines that the object detected in the current processing is identical to the object A detected in the previous processing, and the processing proceeds to step S208.

In step S208, based on the determination that the object of which object position is determined in the current processing is identical to the object of which object position was determined in the previous processing, the identifier setting unit 32 sets an identifier which is identical to an identifier set in the previous processing. In other words, the identifier setting unit 32 inherits the identifier which has been set already with respect to the detection result that has been determined already as the object position.

FIG. 13(b) is a diagram for explaining a case in which the object position M2 determined as the object position of the object A in the previous processing and detected in the current processing is not located in the predicted range K in the current processing, which is calculated from the object position M2 detected in the previous processing. In this case, the identity determining unit 31 determines that the object detected in the current processing is not identical to the object A detected in the previous processing, and the processing proceeds to step S209.

In step S209, based on the determination that the object of which object position is determined in the current processing is not identical to the object of which object position was determined in the previous processing, the identifier setting unit 32 newly sets an identifier which is not registered yet, and then registers the set identifier.

In step S210, the identity determining unit 31 determines whether or not the range of presence estimated in step S104 of the current processing overlaps the predicted range calculated in step S205 of the current processing. In other words, the identity determining unit 31 determines whether or not the object detected in the current processing is identical to the object detected in the previous processing based on the range of presence estimated in the current processing from the object position detected continuously from the previous processing and on the predicted range in the current processing calculated from the object position detected in the previous processing. The processing proceeds to step S211 when there is a portion where the range of presence overlaps the predicted range, or the processing proceeds to step S212 when there is no such an overlapping portion.

FIG. 14 is a diagram for explaining the case where the object position detecting sensors 10 and 20 to detect the detection results to be determined as the position of the object are switched from the previous processing. At the time T−1 in the previous processing, the object positions M1 and M2 were detected by the two object position detecting sensors 10 and 20, respectively, and the object position M2 was determined as the object position of the object A. Meanwhile, the object position M2 is not detected at the time T in the current processing, and the object position M1 is determined as the object position of the object A. A description will be given of a method of causing the identity determining unit 31 in this case to determine in step S210 whether or not the object detected in the current processing is identical to the object detected in the previous processing.

FIG. 15(a) is a diagram for explaining the case in which the predicted range K, which was calculated from the object position M2 determined as the object position of the object A in the previous processing, overlaps the range of presence N1 estimated from the object position M1 detected in the current processing. In this case, the identity determining unit 31 determines that the object position M1 detected in the current processing is identical to the object A detected in the previous processing, and the processing proceeds to step S211.

In step S211, based on the determination that the object of which position is determined in the current processing is identical to the object of which position was determined in the previous processing, the identifier setting unit 32 sets the identifier which is identical to the identifier set in the previous processing. In other words, the identifier setting unit 32 inherits the identifier which has been set already with respect to the detection result that has been determined already as the object position.

FIG. 15(b) is a diagram for explaining the case in which the predicted range K, which was calculated from the object position M2 determined as the object position of the object A in the previous processing, does not overlap the range of presence N1 estimated from the object position M1 detected in the current processing. In this case, the identity determining unit 31 determines that the object detected in the current processing is not identical to the object A detected in the previous processing, and the processing proceeds to step S212.

In step S212, based on the determination that the object of which object position is determined in the current processing is not identical to the object of which object position was determined in the previous processing, the identifier setting unit 32 newly sets an identifier which is not registered yet, and then registers the set identifier.

As described above, according to the object detecting device of the first embodiment, the predicted range in which the object is possibly present at the moment is calculated from the position of the object detected in the past, and the predicted range is used to determine whether or not the object is identical to that detected in the past. In this way, the object detecting device according to the first embodiment can identify a surrounding object at high accuracy based on the predicted range calculated from the detection result in the previous processing, and on the detection result in the current processing by the other object position detecting sensor even when the targeted object is not detected by any one of the object position detecting sensors 10 and 20, for example.

Moreover, the object detecting device according to the first embodiment calculates the predicted range based on the position and the velocity of the object relative to the vehicle P. Thus, it is possible to improve accuracy of the predicted range and to identify the surrounding object at high accuracy.

Second Embodiment

Figure 16:
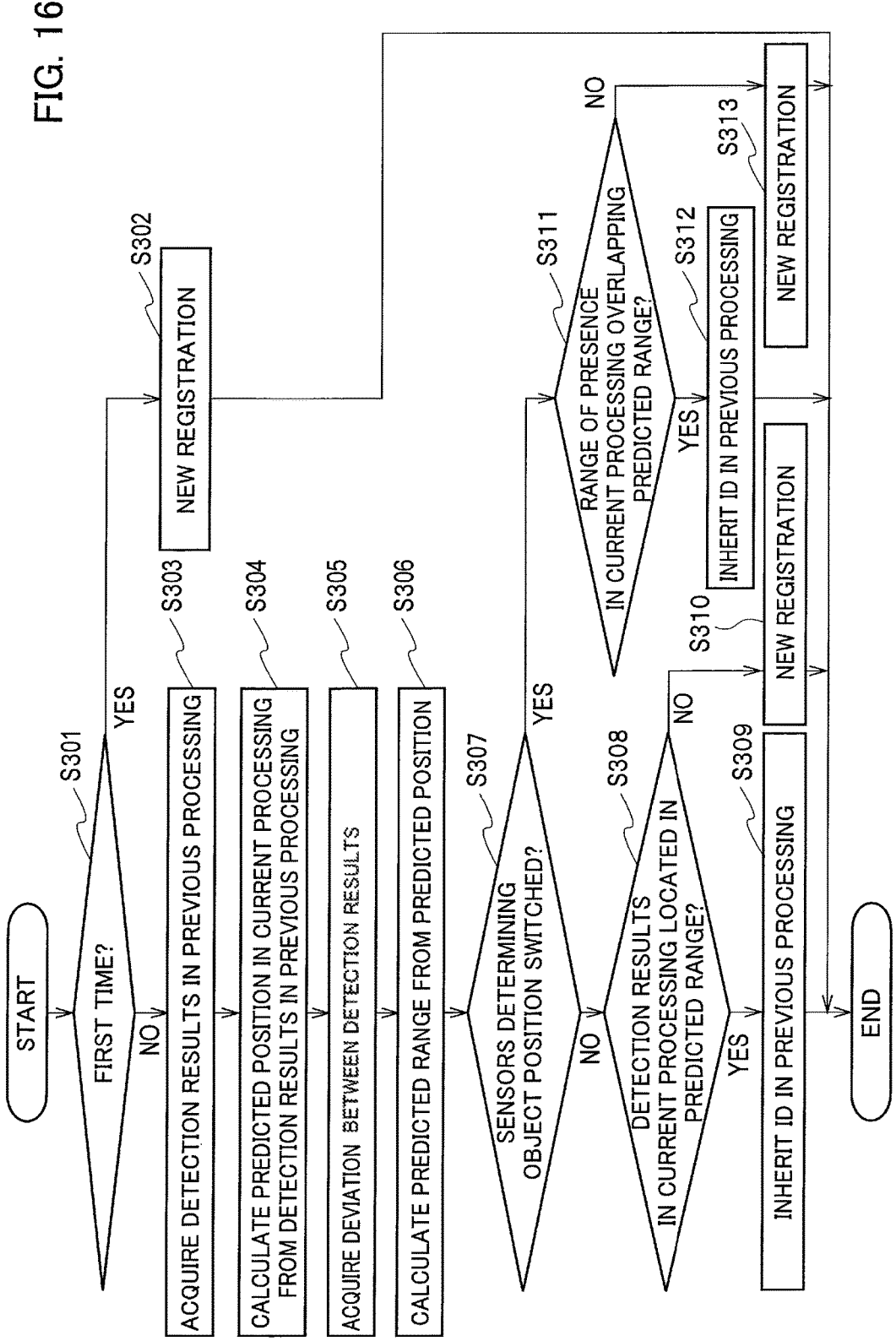
FIG. 16 is a flowchart for explaining detailed processing in step S110 of FIG. 3 to be executed by an object detecting device according to a second embodiment.

FIG. 16 is a flowchart for explaining detailed processing in step S110 of FIG. 3 to be executed by an object detecting device according to a second embodiment. The configurations, operations, and effects not described in the second embodiment are substantially similar to and therefore overlapping those in the first embodiment, and are omitted accordingly. Meanwhile, a description of processing in steps S301 to S304 of FIG. 16 is similar to that of steps S201 to S204 of FIG. 5, and is omitted accordingly.

In step S305, the identity determining unit 31 acquires a deviation between the detection results by the respective object position detecting sensors 10 and 20 in the previous processing regarding the object of which position was determined in step S108, that is, the object detected by the respective object position detecting sensors 10 and 20 and determined to be identical.

Figure 17:
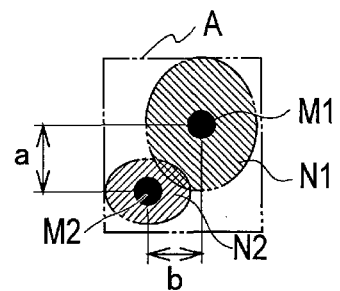
FIG. 17 is an illustrated example of a deviation between detection results by the respective object position detecting sensors.
Figure 17:

FIG. 17 is a diagram for explaining the deviation between the detection results by the respective object position detecting sensors 10 and 20. As shown in FIG. 17, when the positions M1 and M2 are detected by the respective object position detecting sensors 10 and 20, the deviation between the position M1 and the position M2 is "a" in the front-back direction (the x-axis direction) of the vehicle P and "b" in the right-left direction (the y-axis direction) thereof.

In step S306, the identity determining unit 31 calculates the predicted range as the range in which the object is possibly present in the current processing by using the predicted position calculated in step S304. The identity determining unit 31 first calculates a first predicted range from the predicted position calculated in step S304 in accordance with a method similar to step S205. Next, the identity determining unit 31 expands the first predicted range based on the deviation acquired in step S305, and calculates the expanded first predicted range as a second predicted range. In step S306, the identity determining unit 31 calculates the second predicted range as a final predicted range.

Figure 18:
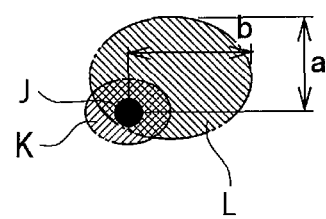
FIG. 18 is a diagram for explaining a predicted range to be calculated based on the deviation.
Figure 18:

FIG. 18 is a diagram for explaining the predicted range to be calculated based on the deviation obtained in step S305. At the time T−1 in the previous processing, the positions M1 and M2 are assumed to have been detected by the respective object position detecting sensors 10 and 20, and the predicted position J and the first predicted range K at the time T in the current processing are assumed to be calculated from the position M2. The identity determining unit 31 further expands the first predicted range K so as to correspond to the deviation (a, b) obtained in step S305, thereby calculating the second predicted range L as the final predicted range in step S306.

Detailed explanations of the processing in subsequent steps S307 to S313 are substantially similar to and overlapping those of steps S206 to S212 of FIG. 5, and will therefore be omitted. It is to be noted, however, that the predicted range in steps S308 and S311 is the final predicted range in step S306.

As described above, according to the object detecting device of the second embodiment, the predicted range in which the object is possibly present at the moment is calculated from the position of the object detected in the past and based on the deviation between the detection results by the respective object position detecting sensors 10 and 20, and then it is determined whether or not the object is identical to the object detected in the past by using the predicted range. In this way, as a consequence of the expanded predicted range, the object detecting device according to the second embodiment can identify a surrounding object at high accuracy based on the predicted range calculated from the deviation between the detection results in the previous processing, and on the detection result in the current processing by the other object position detecting sensor even when the targeted object is not detected by any one of the object position detecting sensors 10 and 20, for example.

Other Embodiments

While the present invention has been described above with reference to the embodiments, it should not be understood that the statements and the drawings constituting part of this disclosure intend to limit the present invention. Various alternative embodiments, examples, and operation techniques will be obvious to a person skilled in the art from this disclosure.

For instance, in the first and second embodiments described above, the identity determining unit 31 may be configured to determine the identity consecutively regarding a detection result which was once determined to be identical but is later not detected temporarily. Specifically, when the identity determining unit 31 determines the object, which is detected by any one of the object position detecting sensors 10 and 20, to be not identical to the object detected by the respective object position detecting sensors 10 and 20 for a predetermined number of times or more starting from the point when the objects detected by the respective object position detecting sensors 10 and 20 were determined to be identical, the identity determining unit 31 may be configured to newly set an identifier to the object determined to be not identical. In this way, the object detecting device can retain the identifier for a predetermined period of time in the case where the object becomes temporarily undetectable due to occlusion, an act of the object straying from the detecting region, and the like, thereby reducing false recognition due to the temporary non-detection, and identifying a surrounding object at high accuracy.

In addition to the description above, it is needless to say that the present invention encompasses various embodiments and the like which are not expressly stated herein. Therefore, the technical scope of the present invention is determined only by the appended claims that are reasonable from the foregoing description.

REFERENCE SIGNS LIST

Q1 detecting region by object position detecting sensor 10
Q2 detecting region by object position detecting sensor 20
10 object position detecting sensor
20 object position detecting sensor
30 object detection circuit
31 identity determining unit
32 identifier setting unit

The invention claimed is:

1. An object detecting method for avoiding objects in a moving vehicle, comprising:
   detecting a position of one or more objects using a plurality of sensors mounted on a moving vehicle, each sensor having a detecting region configured to detect a position of one or more moving objects in the detecting region, the detecting region of one sensor overlapping with detecting regions of other sensors;
   when the plurality of sensors each detect an object, determining with a controller that the object detected by each of the plurality of sensors is the same object when a range surrounding the position of the object detected by one sensor overlaps a range surrounding the position of the object detected by the other sensors;
   determining if the object was identified in a previous detection iteration by obtaining detection results of the previous detection iteration and calculating a predicted range of a subsequent detection iteration based on the position of the object;
   when, in a current iteration, the object previously detected by a second sensor of the plurality of sensors becomes undetectable and a first sensor of the plurality of sensors detects an object in the current iteration, determining that the object detected by the first sensor is an object identical to the object detected in the previous detection iteration when a predicted range in the current iteration calculated from the previously detected position by the second sensor overlaps a range estimated from an object position in the current iteration of the object detected by the first sensor.

2. The object detecting method according to claim 1, wherein the controller is further configured to expand the predicted range based on a deviation between object positions of the plurality of objects obtained when the plurality of objects detected by the plurality of sensors are determined to be the same object.

3. The object detecting method according to claim 1, wherein the controller is further configured to:
   set an identical identifier to the objects determined to be the same and set identifiers different from each other to objects determined to be not identical, and
   when the objects, which are detected by the plurality of sensors, are not identical for a predetermined number of iterations or more starting from an iteration when the objects are determined to be the same, set an identifier to the object determined to be not identical.

4. The object detecting method according to claim 1, wherein the controller is further configured to calculate the predicted range based on a relative velocity at a time of the previous detection iteration of the object which position becomes undetectable in a subsequent iteration.

5. An object detecting device comprising:
   a plurality of sensors mounted on a moving body, each sensor having a detecting region configured to detect a position of one or more moving objects in the detecting region, the detecting region of one sensor overlapping with detecting regions of other sensors; and
   a controller configured to:
      when the plurality of sensors each detect an object, determine that the object is the same object detected by each of the plurality of sensors when a range surrounding the position of the object detected by one sensor overlaps a range surrounding the position of the object detected by the other sensors;
      determine if the object was identified in a previous detection iteration by obtaining detection results of the previous detection iteration and calculating a predicted range of a subsequent detection iteration based on the position of the object;
      when, in a current iteration, the object previously detected by a second sensor of the plurality of sensors becomes undetectable and a first sensor of the plurality of sensors detects an object in the current iteration, determine that the object detected by the first sensor is an object identical to the object detected in the previous detection iteration when a predicted range in the current iteration calculated from the previously detected position by the second sensor overlaps a range estimated from an object position in the current iteration of the object detected by the first sensor.

* * * * *